(12) United States Patent
Martin et al.

(10) Patent No.: US 12,132,870 B1
(45) Date of Patent: *Oct. 29, 2024

(54) USER CONFIGURABLE ROUTING OF VOIP CALLS

(71) Applicant: 8x8, Inc., Campbell, CA (US)

(72) Inventors: Bryan R. Martin, Campbell, CA (US); Garth Judge, Campbell, CA (US); Zhishen Liu, Campbell, CA (US)

(73) Assignee: 8x8, Inc., Campbell, CA (US)

( * ) Notice: Subject to any disclaimer, the term of this patent is extended or adjusted under 35 U.S.C. 154(b) by 164 days.

This patent is subject to a terminal disclaimer.

(21) Appl. No.: 17/391,234

(22) Filed: Aug. 2, 2021

Related U.S. Application Data

(63) Continuation of application No. 16/439,455, filed on Jun. 12, 2019, now Pat. No. 11,082,564, which is a continuation of application No. 15/838,017, filed on Dec. 11, 2017, now Pat. No. 10,334,112, which is a continuation of application No. 14/497,589, filed on Sep. 26, 2014, now Pat. No. 9,843,685.

(51) Int. Cl.
| | |
|---|---|
| *H04M 7/00* | (2006.01) |
| *H04L 41/22* | (2022.01) |
| *H04M 11/04* | (2006.01) |

(52) U.S. Cl.
CPC .......... *H04M 7/0075* (2013.01); *H04L 41/22* (2013.01); *H04M 11/04* (2013.01); *H04M 2242/04* (2013.01)

(58) Field of Classification Search
CPC .............. H04M 7/0075; H04M 11/04; H04M 2242/04; H04L 41/22

USPC ......................................................... 370/401
See application file for complete search history.

(56) References Cited

U.S. PATENT DOCUMENTS

| | | | |
|---|---|---|---|
| 6,973,075 | B1 | 12/2005 | Ziegler et al. |
| 8,300,634 | B2 | 10/2012 | Narayanaswamy et al. |
| 8,422,986 | B1 | 4/2013 | Martin et al. |
| 9,832,685 | B2 | 11/2017 | Tamaki et al. |
| 9,843,685 | B1 | 12/2017 | Martin et al. |
| 10,334,112 | B1 | 6/2019 | Martin et al. |
| 2006/0104432 | A1* | 5/2006 | Evslin ................. H04L 65/1043 370/356 |
| 2007/0206762 | A1* | 9/2007 | Chandra ................. H04L 65/80 379/220.01 |
| 2009/0245234 | A1* | 10/2009 | Parameswar ....... H04M 7/0075 370/352 |
| 2012/0320912 | A1 | 12/2012 | Estrada et al. |
| 2013/0212298 | A1 | 8/2013 | Bunch et al. |

(Continued)

*Primary Examiner* — Intekhaab A Siddiquee
(74) *Attorney, Agent, or Firm* — Crawford Maunu PLLC

(57) ABSTRACT

In one or more embodiments, an apparatus includes a set of servers configured to route calls to and from a plurality of devices over network paths. Each of the devices is respectively associated with one of a plurality of client accounts. A control circuit may be communicatively connected to the one or more servers and directs the servers to route calls for a client account according to a respective routing policy for the client account. The routing policy may indicate one or more routing algorithms for selecting paths of a network for routing each of the calls, and may also indicate a selection algorithm configured to, for each call, one of the set of routing algorithms based on a set of criteria such as date or time of the call.

20 Claims, 3 Drawing Sheets

(56) References Cited

U.S. PATENT DOCUMENTS

| | | | |
|---|---|---|---|
| 2014/0341210 A1* | 11/2014 | LaCroix | H04L 45/22 370/352 |
| 2015/0103672 A1* | 4/2015 | Stuart | H04L 45/02 370/389 |
| 2015/0304934 A1 | 10/2015 | Malatack | |
| 2015/0310730 A1 | 10/2015 | Miller et al. | |
| 2015/0381820 A1* | 12/2015 | Ting | H04L 65/1069 370/259 |
| 2016/0050137 A1* | 2/2016 | Jurasek | H04L 45/123 370/238 |
| 2016/0173342 A1 | 6/2016 | Latham et al. | |

* cited by examiner

USER CONFIGURABLE ROUTING OF VOIP CALLS

FIELD

The present disclosure relates to voice-over-IP (VoIP) communications.

BACKGROUND

VoIP technology allows for calls to be made using internet connections. VoIP technology can be used in place of traditional analog/digital phone lines and can also be used to supplement traditional phone lines. Depending upon the type of VoIP servers and the VoIP provider's capabilities, VoIP calls can be made between VoIP users and/or to anyone having a telephone number (e.g., calls to local, long distance, mobile and/or international numbers). VoIP calls can be initiated and received using a general purpose computer (e.g., using software that provides a soft phone interface), specialized hardware (e.g., a VoIP-enabled telephone), or specialized interface equipment (e.g., a VoIP adapter for an analog telephone).

SUMMARY

Aspects of the present disclosure are directed to an apparatus and method for routing of VoIP calls. These and other aspects of the present disclosure are exemplified in a number of implementations and applications, some of which are shown in the figures and characterized in the claims section that follows.

An apparatus for user-customizable routing of VoIP calls is disclosed. The apparatus includes one or more VoIP servers configured to route VoIP calls to and from a plurality of VoIP-enabled devices. Each of the plurality of VoIP-enabled devices is respectively associated with one of a plurality of client accounts. The apparatus also includes a control circuit communicatively connected to the one or more VoIP servers. For each client account, the control circuit directs the VoIP servers to route VoIP calls to and from the VoIP-enabled devices that are associated with the client account according to a respective routing policy for the client account. The routing policy indicates one or more routing algorithms for selecting paths of a network for routing of the VoIP calls. The routing policy also indicates a selection algorithm. The control circuit and the communicatively connected VoIP servers are configured, in response to the respective routing policy and a VoIP call to or from one of the devices for the client account, to select one of the set of routing algorithms indicated in the routing policy based on and by using the selection algorithm and a set of criteria including geographic origin of the call. The control circuit and the communicatively connected VoIP servers select network paths of the network using the selected routing algorithm and cause the VoIP call to be routed over the selected network paths.

A method is also disclosed for routing of VoIP calls to and from a plurality of VoIP-enabled devices. Each VoIP-enabled device is associated with a respective one of a plurality of client accounts. Each client account has a respective routing policy indicating a respective set of routing algorithms. In a response to a VoIP call to or from one of the VoIP-enabled devices, the one of the plurality of client accounts that is associated with the VoIP-enabled device is determined. Using a selection function indicated in the routing policy of the determined client account, one of the set of routing algorithms is selected based on a set of criteria including geographic origin of the call. The VoIP call is routed through a network by selecting paths of the network according to the selected one of the set of routing algorithms.

The above discussion/summary is not intended to describe each embodiment or every implementation of the present disclosure. The figures and detailed description that follow also exemplify various embodiments.

DESCRIPTION OF THE FIGURES

Various example embodiments may be more completely understood in consideration of the following detailed description in connection with the accompanying drawings, in which.

Figure 1:
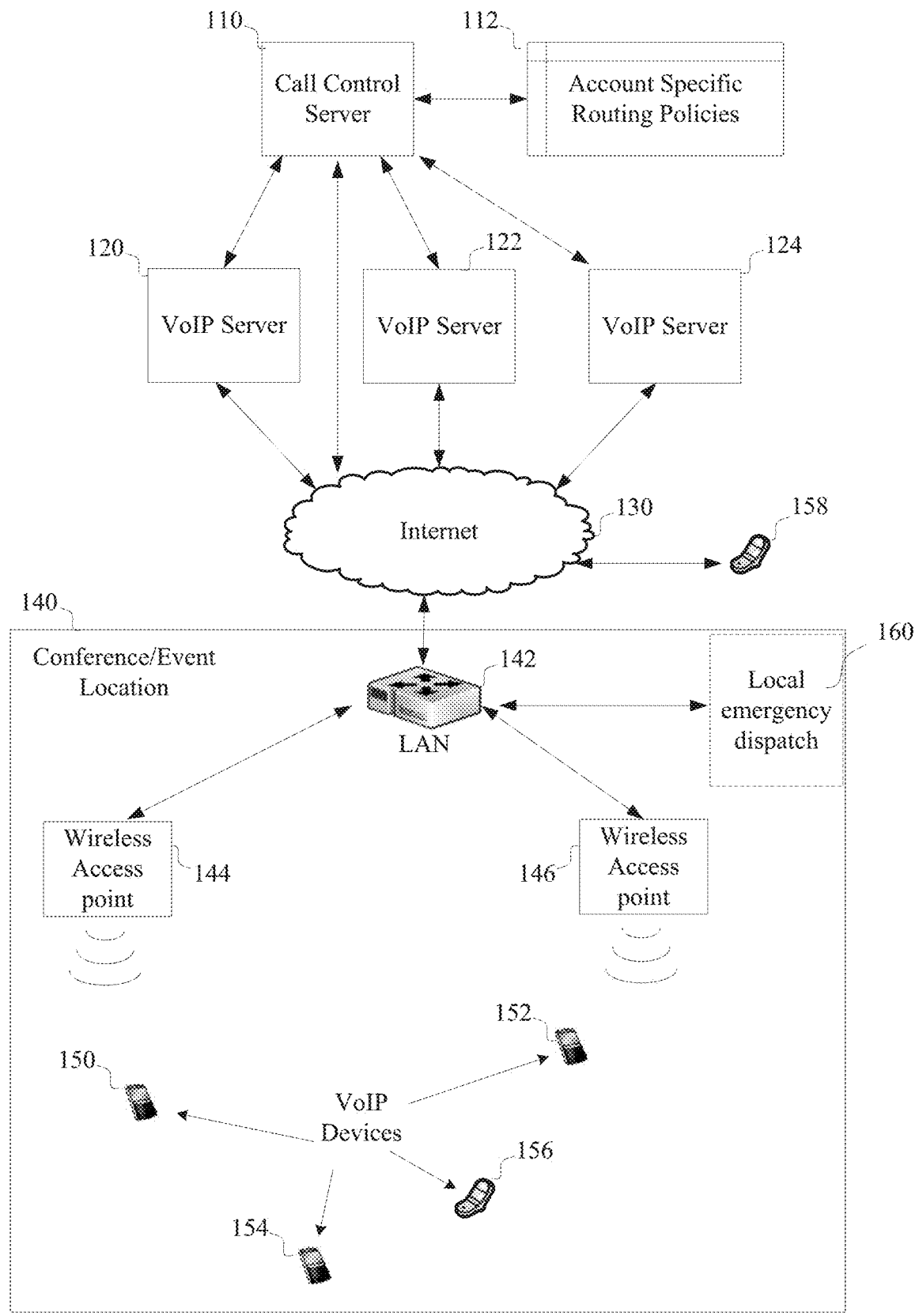
FIG. 1 shows a communication system configured for account specific routing of VoIP calls.

While various embodiments discussed herein are amenable to modifications and alternative forms, aspects thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the disclosure including aspects defined in the claims. In addition, the term "example" as used throughout this application is only by way of illustration, and not limitation.

DETAILED DESCRIPTION

Aspects of the present disclosure are believed to be applicable to a variety of different types of apparatuses, systems and methods involving routing of VoIP calls. While not necessarily so limited, various aspects may be appreciated through a discussion of examples using this context.

VoIP calls may be routed from a source device, though available data networks, to a destination device using various combinations of available data paths. In routing of a VoIP call, VoIP servers employ a routing algorithm to select which ones of the available data paths are to be used for routing of the VoIP call. Most commonly, the routing algorithm employed by a VoIP service as provided is configured to select lowest cost data paths for routing of VoIP calls.

However, a lowest cost routing algorithm may not be best suited for all customers of the service provider. As one example, a customer may wish to pay more for a high-bandwidth data path to route VoIP communications for life-critical applications. For instance, VoIP services may be used by medical surgeons to remotely participate/collaborate on surgeries in real-time. As another example, selecting lowest cost data paths may not be best suited for a high-traffic event, such as conferences, media events, sporting events and/or concerts, where a high number of VoIP calls may be made. For instance, the lowest cost networks may be unable to handle a large number of calls at the same time without degrading performance/reliability. In these circumstances, it may be preferable to route VoIP calls over higher cost networks that have more bandwidth available. Moreover, a VoIP customer may have arranged special routing and/or prices for a large event. As one example, a cellular provider (e.g., AT&T) may set up an account to provide VoIP services for its customers in order to alleviate congestion on its cellular infrastructure at a high-traffic event. In this circumstance, the cellular provider may provide preferred/free routing through its data networks for VoIP calls to/from its customers.

Methods, circuits and apparatuses are disclosed for routing of VoIP calls using a separate set of routing algorithms for each customer. In some embodiments, customers are able to customize a routing policy for routing VoIP calls to/from VoIP-enabled devices linked to the customer's account. The routing policy for each customer account may be configured to specify a plurality of user-defined routing algorithms and specify user-defined criteria indicating when each of the routing algorithms should be used for routing of VoIP calls.

Various example embodiments are directed to apparatuses including one or more VoIP servers configured to route VoIP calls to and from a plurality of VoIP-enabled devices. Each of the plurality of VoIP-enabled devices is respectively associated with one of a plurality of client accounts. The apparatus also includes a control circuit communicatively connected to the one or more VoIP servers. For each client account, the control circuit directs the VoIP servers to route VoIP calls to and from the VoIP-enabled devices associated with the client account according to a respective routing policy for the client account. The routing policy indicates one or more routing algorithms for selecting paths of a network for routing of the VoIP calls.

In some implementations, at least one client account has a routing policy that indicates a plurality of routing algorithms for routing of VoIP calls. Different routing algorithms may route calls to optimize various call parameters such as routing cost, call throughput, call quality, etc. The routing policy also indicates a selection algorithm configured to, for each VoIP call for the client account, select one of the plurality of routing algorithms as a function of geographic origin of the call. For example, one of the client accounts may have a routing policy that indicates a first routing algorithm for calls originating from a first geographic area, and a second routing algorithm for calls originating from outside the first geographic area. In some implementations, the selection algorithm is further configured to select the one of the plurality of routing algorithms as a function of time or date of the call.

In some embodiments, at least one client account has a routing policy that indicates a time range and geographic region of an event. Such a routing policy may be used, for example, to allocate resources for events in which a large number of calls are expected. For instance, during the time range of the event the control circuit may increase the number of VoIP servers configured to route VoIP calls for the account. The routing policy may also specify a routing algorithm to be used for routing calls to or from the event configured to, for example reduce congestion or utilize data paths reserved for the event. In some implementations, a routing policy may direct the VoIP servers to route emergency calls from the event to a special 911 call center (e.g., located on premises).

In some embodiments, the control circuit configured to provide an internet accessible graphical user interface (GUI), through which an authorized user may adjust routing algorithms, routing criteria, and other settings of the respective routing policy for the client account. For example, the authorized user may specify different routing algorithms for different groups of VoIP-enabled devices associated with the account. As another example, the authorized user may specify a routing algorithm for calls originating from or destined to a geographic location. For instance, a user may customize routing algorithms for a high-traffic event defined by a specified location, date and/or time.

Turning now to the figures, FIG. 1 shows a communication system configured for account-specific routing of VoIP calls. The system includes VoIP servers 120, 122, and 124 configured to route VoIP calls to/from various VoIP-enabled devices 150, 152, 154, 156 and 158, over a network (e.g., the Internet 130). The system includes a call control server 110 that configures the VoIP servers to route VoIP calls differently for different ones of a plurality of accounts served by the VoIP servers. Each account has a respective set of VoIP devices associated with the account and account specific routing policies 112 for routing calls to/from the respective set of VoIP devices.

The routing policy for an account indicates one or more routing algorithms for selecting paths of a network for routing of the VoIP calls. In some implementations, the routing policy includes a plurality of routing algorithms and a selection algorithm for selecting from the plurality of routing algorithms for routing of each VoIP call. The selection algorithm may select routing algorithms based on various criteria including, for example, VoIP device ID, geolocation of the VoIP device, data or time of the VoIP call, destination number of the VoIP call and/or carrier preference. The control circuit 110 and the VoIP servers 120, 122, and 124 are configured, in response to the respective routing policy and a VoIP call to/from the respective set of VoIP devices, to select one of the set of routing algorithms indicated in the routing policy based on and by using the selection algorithm and a set of criteria including geographic origin of the call. The control circuit 110 and the VoIP servers 120, 122, and 124 select network paths of the network 130 using the selected routing algorithm and cause the VoIP call to be routed over the selected network paths.

In some implementations, a selection algorithm in the account specific routing policies 112 may be configured to select a specific routing algorithm for routing VoIP calls to/from a high traffic conference/event. Block 140 shows an example high traffic conference/event. In this example, conference/event location 140 includes a plurality of wireless access points 144 and 146 connected in a local area network (LAN) 142. The wireless access points 144 and 146 provide internet access, through which VoIP devices within range may place VoIP calls.

The selection algorithm may be configured to select a first user-defined routing algorithm for routing VoIP calls to or from a high-traffic conference/event. The selection algorithm may define a set of criteria to identify calls to/from the high-traffic conference/event. For example, the selection algorithm may be configured to only use the first user-defined routing algorithm for routing VoIP calls to/from VoIP devices within a specified geographic region for the event and which occur within a specified date or time range for the event.

In some embodiments, a routing policy for an account may be configured to route emergency calls differently for high-traffic events. For instance, a large event (e.g. a sporting event, concert or convention) may have a local emergency dispatch 160 for coordinating efforts of security officers, health emergency medical technicians and/or other emergency first responders. In some implementations, a routing policy may direct the VoIP servers to route emergency calls originating from the high-traffic event to the central office which may be able to respond to the emergency more quickly than the normal emergency dispatch.

In some implementations, the routing policy may specify a set of VoIP-enabled devices assigned to emergency and security personal. The control circuit may direct the VoIP servers to prioritize routing of VoIP calls from the set of VoIP-enabled devices assigned to emergency and security personnel over other VoIP calls.

In some embodiments, the control server may allocate resources of the VoIP servers based on the routing policy for each account. For example, in some implementations, a routing policy for an account may indicate a geographic region and time for a high-traffic event and may request a number of VoIP servers be dedicated for routing VoIP calls to/from VoIP devices located at the high-traffic event. In some embodiments, the VoIP servers may be cloud-based servers that may be provisioned as needed to satisfy the resource allocation requests indicated in the routing policy of an account.

Figure 2:
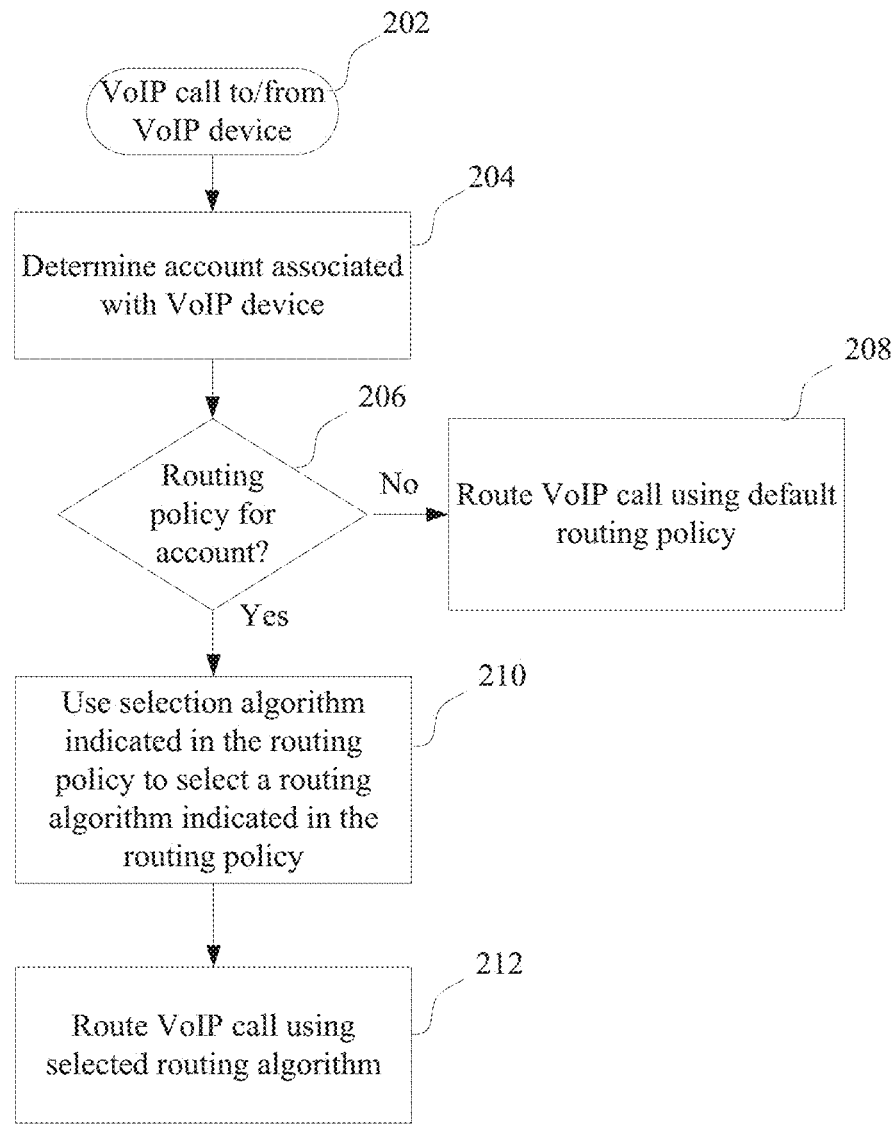
FIG. 2 shows a process for routing VoIP calls in accordance with one or more embodiments.

FIG. 2 shows a process for routing VoIP calls in accordance with one or more embodiments. In response to a VoIP call 202 to/from a VoIP device, an account associated with the device is determined at block 204. If no routing policy is specified for the determined account, decision block 206 directs the process to route the VoIP call using a default routing policy at block 208. For example, the process may be configured to use a lowest-cost routing algorithm if a custom routing policy is not specified for the account. Otherwise, if a routing policy is specified for the determined account, the process is directed to block 210. At block 210, the process uses a selection algorithm indicated in the routing policy to select a routing algorithm indicated in the routing policy. At block 212, the VoIP call is routed using the selected routing algorithm.

The selection algorithms may employ various criteria to determine which routing algorithm is to be selected. For example, the selection of the routing algorithms may be based on, for example, VoIP device ID, geolocation of the VoIP device, data or time of the VoIP call, destination number of the VoIP call, and/or carrier preference. In some implementations, the selection algorithm may prioritize the routing algorithms indicated in a routing policy and specify criteria indicating when each of the routing algorithms should be used. The selection algorithm may select the highest priority routing algorithm for which criteria is satisfied.

Figure 3:
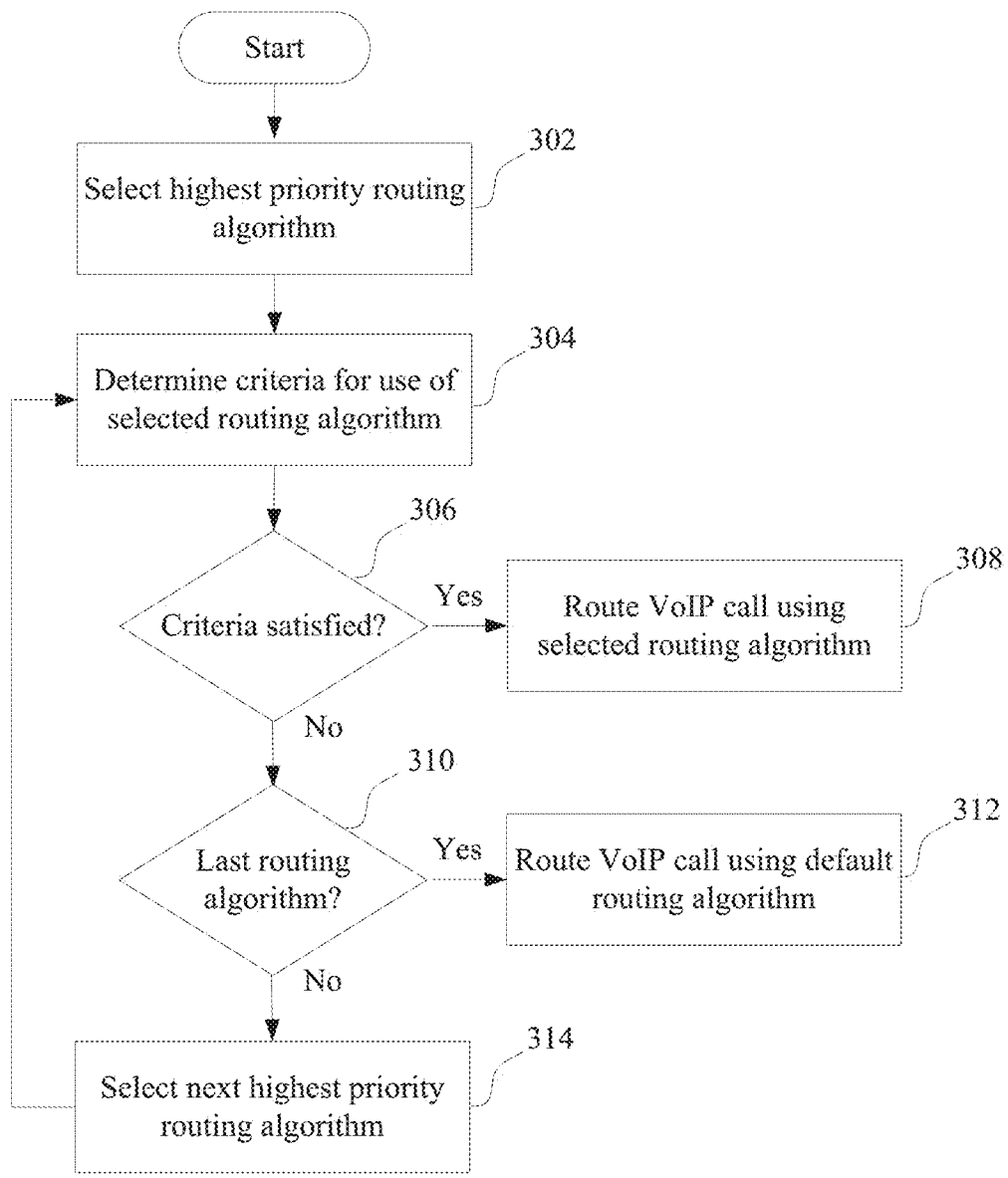
FIG. 3 shows an example process for selecting a routing algorithm to use for routing VoIP calls.

FIG. 3 shows an example process for selecting a routing algorithm to use for routing VoIP calls. At block 302, the routing algorithm having the highest priority is initially selected. Criteria for use of the selected routing algorithm are determined at block 304. If the criteria are satisfied, decision block 306 directs the process to route the VoIP call using the selected routing algorithm at block 308. If the criteria are not satisfied, decision block 306 directs the process to decision block 310. If the selected algorithm is not the last algorithm, decision block 310 directs the process to select the next highest priority routing algorithm at block 314. Criteria for the selected routing algorithm is again determined at block 304 and analyzed at decision blocks 306 and 310. The process continues in this manner until criteria for one of the routing algorithms is satisfied at block 306. If criteria are not satisfied for any of the routing algorithms, decision block 310 directs the process to block 312, where the VoIP call is routed using the default routing algorithm.

Consistent with various embodiments described with reference to FIGS. 1, 2, and/or 3, in some embodiments the criteria for selection of routing preferences may be configured by an authorized user of an account via a graphical user interface (GUI). In some implementations, an individual user may be able to adjust one or more routing preferences for a telecommunication device of the account that is assigned to the user. For example, the GUI may include a settings menu where a user can choose preferences for how (s)he wishes the application to place outbound and inbound calls. The settings menu may include a set of preferences for placing outbound calls. The preference may include, for example, options to, 1. Always prompt the user for how that call should be placed;
2. Always use Wi-Fi/Mobile data connections to route the call as a VoIP/data call; or
3. Always use a cellular voice connection to route the call.

Similarly, the settings menu may include a set of preferences for receiving inbound calls. The preference may include, for example, options to, 1. Always use Wi-Fi/Mobile data connections to receive the call; or
2. Always receive the call as a cellular voice call.

In some embodiments, the GUI may include another settings menu (e.g., in an "Advanced" tab) providing a mechanism for an authorized user to adjust how 911 calls are routed. The settings may be adjusted to route a 911 call as a regular cellular 911 call (e.g., using geo/antenna information for the cellular network), to route the 911 call as a regular VoIP 911 call (using static location information for that business account to route the call back over the landline 911 network), or to route 911 calls using a customized 911 routing specified for a high-traffic event. The 911 call routing preference overrides the outbound or inbound routing preferences set by a user. In some embodiments, an authorized user, such as an account manager, may specify routing criteria/preferences having a higher priority than routing criteria/preferences set by an individual user of the account. Thus, in routing of calls to and/or from devices included in the account, higher priority criteria/preferences set by the account manager would override conflicting criteria/preferences set by an individual user.

Various blocks, modules or other circuits may be implemented to carry out one or more of the operations and activities described herein and/or shown in the figures. In these contexts, a "block" (also sometimes "logic circuitry" or "module") is a circuit that carries out one or more of these or related operations/activities (e.g., configuring VoIP servers, selection routing algorithms, or routing VoIP calls). For example, in certain of the above-discussed embodiments, one or more modules are discrete logic circuits or programmable logic circuits configured and arranged for implementing these operations/activities, as in the blocks/modules shown in FIGS. 1, 2 and 3. In certain embodiments, such a programmable circuit is one or more computer circuits programmed to execute a set (or sets) of instructions (and/or configuration data). The instructions (and/or configuration data) can be in the form of firmware or software stored in and accessible from a memory (circuit). As an example, first and second modules include a combination of a CPU hardware-based circuit and a set of instructions in the form of firmware, where the first module includes a first CPU hardware circuit with one set of instructions and the second module includes a second CPU hardware circuit with another set of instructions.

Certain embodiments are directed to a computer program product (e.g., nonvolatile memory device), which includes a machine or computer-readable medium having stored thereon instructions which may be executed by a computer (or other electronic device) to perform these operations/activities.

Based upon the above discussion and illustrations, those skilled in the art will readily recognize that various modifications and changes may be made to the various embodiments without strictly following the exemplary embodiments and applications illustrated and described herein. For example, though aspects and features may in some cases be described in individual figures, it will be appreciated that features from one figure can be combined with features of another figure even though the combination is not explicitly shown or explicitly described as a combination. Such modifications do not depart from the true spirit and scope of various aspects of the invention, including aspects set forth in the claims.

What is claimed is:

1. A method for use with a data communications system having one or more servers that are to provide communications services via a plurality of client accounts and to route calls between a plurality of devices via a plurality of network paths, each of the plurality of devices including a user-operated communications circuit and being associated with a respective client account of the plurality of client accounts, the method carried out for at least one account of the plurality of client accounts and comprising:
   selecting one of a plurality of routing algorithms, as indicated in a respective routing policy corresponding to said at least one account, by comparing a time or date of a call to a time and date associated with an event according to information set forth in the respective routing policy; and
   causing at least one call, from among the calls, involving one or more of the plurality of devices to be routed over network paths which are selected via a routing algorithm from among the plurality of routing algorithms.

2. The method of claim 1, wherein the plurality of client accounts include respectively different routing policies having different sets of routing algorithms, including said one of a plurality of routing algorithms, and different selection algorithms indicative of selectable ones of the routing algorithms.

3. The method of claim 1, wherein said selecting one of a plurality of routing algorithms includes selecting from among different routing algorithms through which the at least one call is to be routed for different ones of the plurality of client accounts based on different respectively-associated routing policies.

4. The method of claim 1, further including selecting the one of a plurality of routing algorithms ("the selected algorithm") in response to information indicative of the at least one call satisfying criteria associated with the one of a plurality of routing algorithms being selected.

5. The method of claim 4, wherein the selected algorithm includes a prioritization of a set of devices among the plurality of devices have prioritized routing, for certain of the calls over other of the calls, indicated in the respective routing policy.

6. The method of claim 1, wherein said selecting one of a plurality of routing algorithms is based on information indicative of said at least one call satisfying criteria associated with the selected routing algorithm, and the respective routing policy specifies user-defined criteria indicating when the selected one of the plurality of routing algorithms is to be selected for routing the calls.

7. The method of claim 6, further including routing said at least one call through a network by selecting network paths according to the selected routing algorithm.

8. The method of claim 1, further including selecting a first routing algorithm for calls during the date and time of the event; and selecting a second routing algorithm for calls originating from outside a selected geographic area during the date and time of the event or outside of the date and time of the event, the first and second routing algorithms being from among the plurality of routing algorithms.

9. The method of claim 1, wherein said selecting one of a plurality of routing algorithms includes taking into account costs of available routes.

10. An apparatus comprising:
   a data communications system having one or more servers that are to provide communications services via a plurality of client accounts and to route calls between a plurality of devices via a plurality of network paths, each of the plurality of devices including a user-operated communications circuit and being associated with a respective client account of the plurality of client accounts;
   a control circuit communicatively coupled with or as part of the data communications system, wherein the control circuit is to, for at least one account of the plurality of client accounts:
      select one of a plurality of routing algorithms, as indicated in a respective routing policy corresponding to said at least one account, by comparing a time or date of a call to a time and date associated with an event according to information set forth in the respective routing policy; and
      cause at least one call, from among the calls, involving one or more of the plurality of devices to be routed over network paths which are selected via a routing algorithm.

11. A method for use by at least one data-communications server, having a control circuit communicatively integrated therewith, that is to route calls between a plurality of devices via a plurality of network paths, wherein each of the plurality of devices includes a user-operated communications circuit and is associated with a respective client account of a plurality of client accounts, the method comprising:
   directing or causing, for at least one of the plurality of client accounts, the at least one data-communications server to route the calls using a routing policy associated with a set of routing algorithms and user-defined criteria, the calls to be routed relative to a plurality of devices indicated as being associated with a specific event relating to a change in volume of the calls, indicating when at least one of the routing algorithms should be selected for routing the calls using the routing policy; and
   in response to one of the calls involving a respective one of the devices ("the device") associated with the client account and for said at least one of the plurality of client accounts, using the control circuit to select one of the set of routing algorithms indicated in the routing policy, based on at least one of the following information associated with the device involved in said one of the calls satisfying criteria associated with the selected routing algorithm: identification data of the device, geolocation of the device, date of the call, time of the call, destination number of the call, and carrier preference indicated for the device.

12. The method of claim 11, wherein the routing policy further includes a selection algorithm indicating, for each of the routing algorithms in the set of routing algorithms, criteria to be satisfied for selecting respective routing algorithms of the set.

13. The method of claim 11, wherein in response to the one of the set of routing algorithms being selected ("the selected routing algorithm"), the control circuit is further to cause said one of the calls to be routed over certain network paths which are selected based on the selected routing algorithm.

14. The method of claim 11, wherein the selected routing algorithms is based on date or time of the call.

15. The method of claim 11, wherein the change in volume of calls, in connection with the specific event, is an increase in the volume of calls.

16. The method of claim 11, wherein the selected one of the set of routing algorithms is based on destination number of the call, and wherein the control circuit causes said one of the calls to be routed over selected network paths according to the destination number.

17. The method of claim 11, wherein the selected one of the set of routing algorithms is based on carrier preference indicated for the device, and wherein the control circuit causes said one of the calls to be routed over selected network paths according to the carrier preference indicated for the device.

18. The method of claim 11, further including selecting one of the plurality of routing algorithms based on a plurality of call parameters, the plurality of call parameters including parameters selected from the group consisting of: routing cost, call throughput, call quality, and a combination thereof.

19. The method of claim 11, wherein each of the plurality of client accounts includes a different routing policy having a different set of routing algorithms and a different selection algorithm, and the method further include allocating resources of the at least one data-communications server based on the routing policy for each client account.

20. The method of claim 11, further including providing an internet-based graphical user interface (GUI) for at least one of the plurality of client accounts; and wherein the control circuit or the at least one data-communications server prompts an authorized user via the GUI, associated with said at least one of the plurality of client accounts, for directing how a respective call is be routed or placed.

* * * * *